United States Patent
Zapf et al.

(10) Patent No.: US 11,383,315 B2
(45) Date of Patent: Jul. 12, 2022

(54) METHOD FOR PRE-TREATING STAINLESS STEEL SUBSTRATES BEFORE SOLDERING USING NANOCRYSTALLINE SOLDER FOILS

(71) Applicant: Vacuumschmelze GmbH & Co. KG, Hanau (DE)

(72) Inventors: Lothar Zapf, Alzenau (DE); Natalia Ankuda, Büdingen (DE); Manfred Reuther, Buedingen (DE)

(73) Assignee: VACUUMSCHMELZE GMBH & CO. KG, Hanau (DE)

( * ) Notice: Subject to any disclaimer, the term of this patent is extended or adjusted under 35 U.S.C. 154(b) by 64 days.

(21) Appl. No.: 16/779,347

(22) Filed: Jan. 31, 2020

(65) Prior Publication Data
US 2020/0246897 A1 Aug. 6, 2020

(30) Foreign Application Priority Data
Feb. 1, 2019 (DE) ...................... 10 2019 102 544.3

(51) Int. Cl.
*C25D 5/12* (2006.01)
*C25D 5/18* (2006.01)
(Continued)

(52) U.S. Cl.
CPC ............... *B23K 1/20* (2013.01); *C25D 3/12* (2013.01); *C25D 3/30* (2013.01); *C25D 5/12* (2013.01);
(Continued)

(58) Field of Classification Search
CPC ..... C23C 18/1653; C23C 28/023; C25D 5/12; C25D 5/18; C25D 5/36; B23K 2103/166
(Continued)

(56) References Cited

U.S. PATENT DOCUMENTS 3,616,292 A * 10/1971 Wilson ............... C25D 5/44
205/139
3,715,231 A * 2/1973 Ng ............... F17C 1/10
206/524.3
(Continued)

FOREIGN PATENT DOCUMENTS

CN 104862749 A * 8/2015 ............... C25D 3/30
DE 102006035765 A1 1/2008
(Continued)

OTHER PUBLICATIONS

Zatkalkov et al., "Pitting Corrosion of Stainless Steel at the Various Surface Treatment," Materials Engineering (Sep. 27, 2011), vol. 18, No. 4, pp. 115-120. (Year: 2011).*
(Continued)

*Primary Examiner* — Edna Wong
(74) *Attorney, Agent, or Firm* — Dickinson Wright PLLC

(57) ABSTRACT

A method for plating a stainless steel substrate is provided. According to one embodiment, the method comprises sandblasting at least one joint surface of a stainless steel substrate and treating the joint surface of the stainless steel substrate with an aqueous solution (acid bath) which contains sulfuric acid, nitric acid and hydrofluoric acid. The stainless steel substrate is then rinsed with hydrochloric acid. The method further includes galvanic deposition of a nickel plating on the joining surface of the stainless steel substrate and the subsequent deposition of a tin layer on the nickel-coated joining surface of the stainless steel substrate.

11 Claims, 2 Drawing Sheets

(51) Int. Cl.
  *C25D 5/36* (2006.01)
  *B23K 1/20* (2006.01)
  *C25D 3/12* (2006.01)
  *C25D 3/30* (2006.01)
  *B23K 101/34* (2006.01)
  *B23K 103/04* (2006.01)

(52) U.S. Cl.
  CPC ...... *B23K 2101/35* (2018.08); *B23K 2103/05* (2018.08)

(58) Field of Classification Search
  USPC ............... 205/191, 102, 181, 208, 218, 225; 228/262.41
  See application file for complete search history.

(56) References Cited

U.S. PATENT DOCUMENTS

| | | | |
|---|---|---|---|
| 6,773,828 B1* | 8/2004 | Ooi | C25D 5/10 205/170 |
| 9,834,848 B2 | 12/2017 | Nishida et al. | |
| 2004/0247978 A1* | 12/2004 | Shimamune | H01M 8/0232 429/518 |
| 2013/0029170 A1* | 1/2013 | John | C25D 5/18 428/596 |
| 2017/0159197 A1* | 6/2017 | Nishida | C25D 5/12 |

FOREIGN PATENT DOCUMENTS

| | | | | |
|---|---|---|---|---|
| EP | 0080971 A1 | 6/1983 | | |
| EP | 1260614 A | 11/2002 | | |
| EP | 1631450 B1 | 11/2007 | | |
| EP | 2557617 A1 | 2/2013 | | |
| GB | 0584934 A | 1/1947 | | |
| GB | 2581024 A | 8/2020 | | |
| JP | 61117291 A | * | 6/1986 | ............. C21D 6/002 |
| JP | 200544895 A | 6/2005 | | |

OTHER PUBLICATIONS

Mills, "Abrasive Blasting with Post-Process and In-Situ Characterization," PhD diss., Virginia Tech, 2014, 112 pp. (Year: 2014).*
British Combined Search & Examination Report dated Jul. 1, 2020 corresponding to British Application No. GB20142.0.
Supplemental British Search Report regarding GB Application No. GB2001427.0 dated Oct. 5, 2020.
British Examination Report regarding GB Application No. 2100411.4 dated Feb. 8, 2021.
British Search Report regarding GB Application No. 2100411.4 dated Feb. 5, 2021.

* cited by examiner

METHOD FOR PRE-TREATING STAINLESS STEEL SUBSTRATES BEFORE SOLDERING USING NANOCRYSTALLINE SOLDER FOILS

CROSS-REFERENCE TO RELATED APPLICATIONS

This U.S. patent application claims the benefit of German Patent Application No. DE 10 2019 102 544.3, filed 1 Feb. 2019, the entire contents of which are incorporated herein by reference for all purposes.

TECHNICAL FIELD

The present description relates to the field of joining technologies, in particular to a method for the pretreatment of stainless steel substrates previous to soldering.

BACKGROUND

Soldering is a thermal process for bonded joining during which a liquid phase is produced on the interface surfaces of the parts to be joined by melting a solder or by means of diffusion. Although the liquidus temperature of joined parts is not reached during soldering, in the course of many soldering processes the joined parts are strongly heated. For this reason, many soldering methods are unsuitable for the joining of permanently magnetized components as these can be fully or partially demagnetized by the heat produced in the soldering process.

In his dissertation at the Helmholtz Zentrum Berlin and the Technische Universitat Berlin, Carsten Kuhn developed a soldering method for joining rare earth magnets using reactive nanofoils (e.g. so-called NanoFoil®, sold by Indium Corp., Utica, N.Y.). The work was carried out in the Undulator Department under the guidance of Johannes Bahrdt. The method is described in the dissertation "Developing Manufacturing Methods for a Cryogenic Undulator and its Validation by means of Magnetic Measurements of a Prototype" (Technische Universität Berlin, Feb. 11, 2016), as well as in the publication J Bahrdt, C. Kuhn, *"Cryogenic Permanent Magnet Undulator Development at HZB/BESSY II"*, Synchrotron Radiation News, Vol. 28, No. 3 (2015) 9-14. Due to the very rapid heating of the nanofoil, very little heat is transferred to the joined components. The method makes it possible to join magnets without risking a partial demagnetization. This becomes even more essential the smaller the magnet dimensions become. The joined magnets were successfully inserted into an undulator that has a period length of only 9 mm.

In order to obtain a reliable solder bonding, it is essential that the surfaces to be joined be easily wetted and that they form a material bond. The rare earth alloys used for permanent magnets (such as, e.g. of neodymium iron-boron, praseodymium iron-boron or samarium-cobalt) are generally not easy to wet and therefore the joined interfaces have to be plated before soldering, for which tin or gold may be used as the plating material. The same must be said with regard to the surfaces of substrates made of soft magnetic material (e.g. cobalt-iron) and with regard to stainless steel substrates.

Using the soldering method known from the abovementioned dissertation, permanently magnetized components can be soldered together or with soft magnetic substrates. Trials have shown, however, that producing the tin layer needed to solder onto stainless steel substrates presents a problem, as tin layers produced in a conventional manner do not easily adhere to stainless steel surfaces, making it impossible to produce a soldered connection of sufficient strength.

The inventors have set themselves the goal of developing a tin plated stainless steel substrate with a firmly adhering tin layer, as well as a method for manufacturing such a stainless steel substrate.

SUMMARY

The aforementioned goal is achieved by means of the method of the present disclosure, the soldered object of the present disclosure, and the component of the present disclosure. Various embodiments and further developments provide the subject matter of the dependent claims.

In the following, a method for plating a stainless steel substrate will be described. In accordance with one embodiment, the method comprises the sandblasting of at least one joining surface of a stainless steel substrate and a treatment of the stainless steel substrate using an aqueous solution (acid bath) that contains sulfuric acid, nitric acid and hydrofluoric acid. After this the stainless steel substrate is rinsed with hydrochloric acid. The method further comprises the galvanic deposition of a nickel plating onto the joining surface of the stainless steel substrate, as well as the subsequent deposition of a tin layer onto the nickel plated joining surface of the stainless steel substrate.

Further, a soldered object will be described. In accordance with one embodiment, the soldered object comprises a stainless steel substrate, wherein an adhesion-promoting plating is made of nickel is deposited on at least one surface of the stainless steel substrate. The object further comprises a rare earth magnet that is attached to the stainless steel substrate by means of a solder bond.

Further, a method for producing a soldered bonding of a stainless steel substrate and a rare earth magnet will be described. In accordance with one embodiment, the method comprises providing a stainless steel substrate, wherein an adhesion-promoting plating made of nickel is deposited on at least one joining surface of the stainless steel substrate and wherein a tin layer is deposited on the adhesion-promoting plating. The method further comprises arranging a soldering foil onto the joining surface of the stainless steel substrate, arranging a rare earth magnet onto the soldering foil such that the soldering foil lies between the stainless steel substrate and the rare earth magnet and producing a soldered bond by heating the soldering foil.

BRIEF DESCRIPTION OF THE DRAWINGS

In the following, embodiments will be described in greater detail with reference to figures. The illustrations are not necessarily true to scale and the embodiments are not limited to the illustrated aspects. Instead importance is given to illustrating the underlying principles of the embodiments. The figures show.

DETAILED DESCRIPTION

Figure 1:
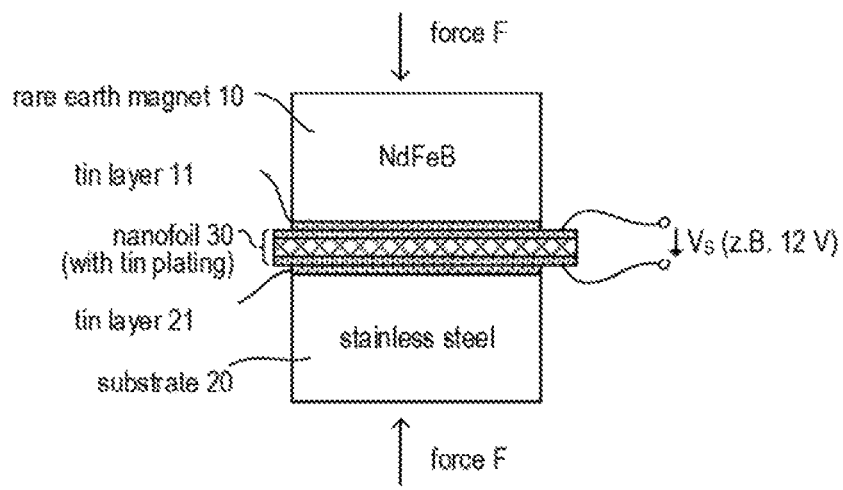
FIG. 1 schematically illustrates a soldering process using nanofoil.

FIG. 1 schematically illustrates a soldering process for joining a rare earth magnet 10 to a substrate 20 which, in the example described here, is made of stainless steel. Two rare earth magnets or a rare earth magnet and a soft magnetic magnet (e.g. cobalt-iron) can also be soldered together in the same way. The material of which the substrate is made is of only secondary importance but, as a rule, the substrate must be tin plated. Specifically in the present case, the surfaces of the rare earth magnet 10 and the substrate 20 that are intended to be joined are tin plated (tin layer 11 and 21). A tin plated nanofoil is arranged between the components 10 and 20. As mentioned previously, it is difficult to produce a well adhering tin layer on a substrate made of stainless steel using conventional methods. However, before elaborating on the pretreatment of the stainless steel substrate 20 to produce the tin layer 21, the soldering process using nanofoil will be described in detail.

The nanofoil is a multilayer system which may comprise, for example, numerous alternately arranged aluminum and nickel layers. Such Multilayer systems may also be made of other materials, e.g. aluminum/titan or nickel/silicon. A nanofoil may comprise may thousand alternating layers made of, e.g. aluminum and nickel, wherein the separate layers can have a thickness in the range of 25 nm to 90 nm. The entire nanofoil can have a thickness in the range of 10-100 μm. Provided that the layers are thin enough and that the reaction products of the layers exhibit a negative binding enthalpy (e.g. one of −59.2 kJ per mol in the case of aluminum/titan), with the aid of a relatively small contribution of energy (e.g. the application of an electrical voltage Vs, see FIG. 1), a self-propagating exothermal reaction can be triggered which heats the nanofoil and sets off a diffusion process that forms the soldered bond. Once its solidus temperature has been surpassed, the solder becomes at least partially fluid, setting off diffusion processes that form a material bond between the solder and the interfaces of the joined parts.

During the soldering process, an apparatus not shown in FIG. 1 is employed to apply pressure (see FIG. 1, force F) onto the joining region. The pressure (joining pressure) during soldering can lie in the range of 0.1 to 0.3 MPa. The amount of heat released during soldering depends on the area of the joining surfaces and on the thickness of the reactive foil. The obtainable energy density lies at around 1000-1250 J/g and locally (in the region of the joining), temperatures of 130-1500 degrees Celsius may arise. During the process, the heat is generated directly in the joining region and the amount of heat remains small enough so as not to significantly heat up the components 10 and 20. With this method, thermal impacts on the magnetic (or other) properties of a magnetic component (in particular a reduction of it remanent magnification) can be avoided. As mentioned earlier, suitable nanofoils are already available, e.g. one known as Nanofoil® that is sold by Indium Corp., Utica, N.Y.). The corresponding joining process is known as NanoBond®. As opposed to other soldering processes, no soldering flux is needed.

The adhesion of the tin layers 11 and 21 on the underlying surfaces of the rare earth magnet 10 and the substrate 20 play a decisive role in obtaining a soldered bond of sufficient strength. As mentioned earlier, it is not all that easy to produce a tin layer that adheres to a stainless steel surface with sufficient adhesion strength. The embodiments described in the following concern a method for pretreating the substrate 20 (and, in particular, a stainless steel substrate) that allows a tin layer to be deposited onto the substrate 20 that forms a secure material bond with the substrate. Stainless steel is meant here to designate a non-rusting steel (see DIN EN 10088-2). In the embodiments described here, a non-rusting austenitic steel, in particular a steel made of chromium, nickel and molybdenum, can be used. A steel with the material specification X2CrNiMoN17-13-3 (material number 1.4429 as per DIN EN 10027-2) was used for the experimental work. Other non-rusting steels, however, can also be used.

Various methods for producing firmly adhering galvanic platings on stainless steel surfaces are described in relevant publications such as, e.g. pickling in a hot (approximately 70° Celsius) sulfuric acid solution with 20% to 50% (mass percent) sulfuric acid, cathodic treatment in sulfuric acid or hydrochloric acid, activation in an iron or nickel strike bath with subsequent galvanization. All of these methods do produce firmly adhered layers during galvanic tin layer, but the layer's bonding is again dissolved during the subsequent soldering with nanofoil and the tin layer suffers loses its adhesion to the stainless steel substrate. With the embodiments described here, stainless steel substrates a with firmly adhered galvanic tin layer can be produced that maintain their adhesion strength even after the soldering process with nanofoils. In experiments, adhesion strengths of more than 15 N/mm2 could be measured in the magnet/stainless steel system. The adhesion strength of the bonded magnet/stainless steel components was measured in a shear test.

Figure 2:
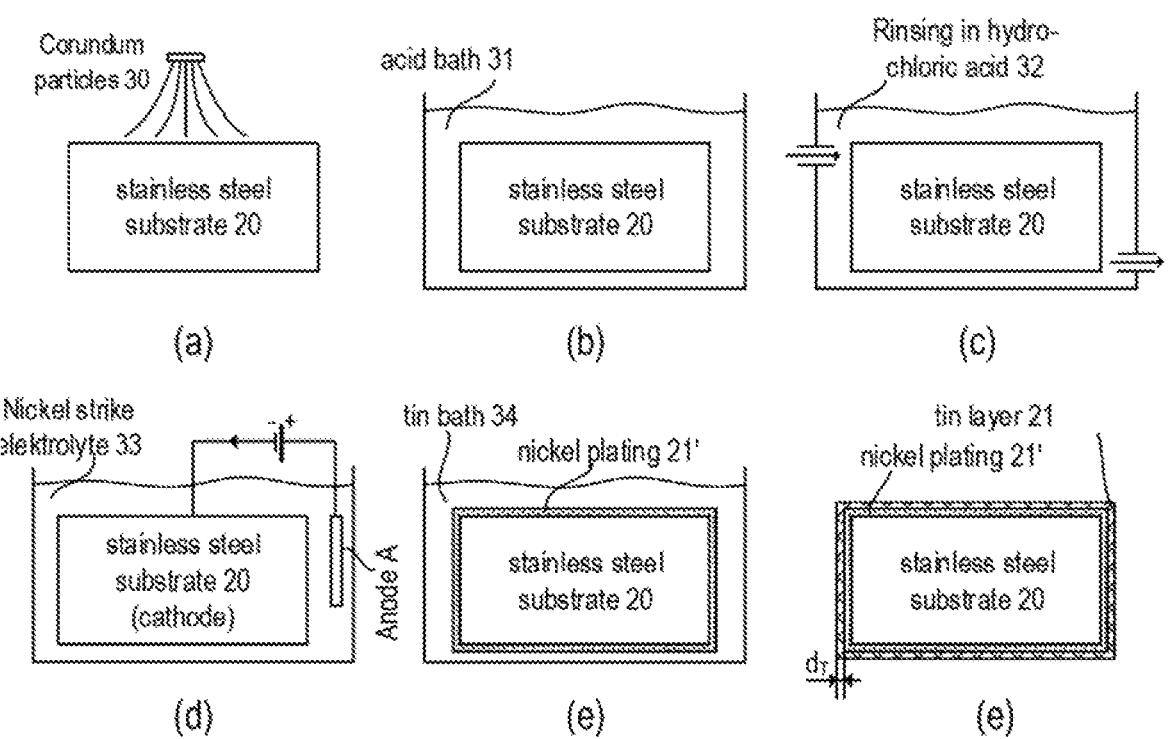
FIG. 2 illustrates an example of a method for plating a stainless steel substrate.

FIG. 2 schematically illustrates the various process steps. Accordingly, first the surface of the stainless steel substrate 20 that is to be plated (and that has, if needed, been cleaned) is sandblasted (see diagram (a) of FIG. 2). Corundum particles (blasting corundum) and a blasting pressure of 1-10 bar (100-1000 kPa), e.g. 8 bar, can be employed for the sandblasting. Optionally, the surface can be blown clean afterwards using oil-free compressed air. The blasting corundum can be of mixed particles with particle sizes of between 250 and 500 μm. The most widely used methods are also known as compressed-air blasting. Further technologies include airless blasting, in which the particles are accelerated by an impeller, as well as vacuum blasting.

In a following step, the substrate 20 is immersed into an acid bath 31 for a period of, for example, 2-3 minutes (see diagram (b) of FIG. 2). The acid bath 31 can consists of an aqueous solution of 1-20% sulfuric acid, 1-20% nitric acid and 1-15% hydrogen fluoride (hydrofluoric acid). The rest of the 100% is water. Percentages are all given as mass percents. In one specific embodiment the acid bath contains 50 g concentrated sulfuric acid, 100 g of nitric acid (53% solution) and 75 g hydrofluoric acid (40% solution, corresponding to 30 g hydrogen fluoride) per liter fully desalinated (FD) water. The duration of the treatment can be approximately 2-3 minutes. In accordance with the embodiments described here, the acid bath 31 can be tempered. For example, the acid bath 31 has a temperature of between 40 and 95 degrees Celsius, in particular around 70 degrees Celsius.

Oxides that would otherwise form a passivating film on the surface of the substrate 20 are removed in the acid bath, thereby activating the surface (surface activation). A passivating film of chromium oxide generally forms on the surface of stainless steel which is removed in the acid bath 31. After this, the treated surfaces of the substrate 20 are rinsed with diluted hydrochloric acid (see diagram (c) of FIG. 2). In accordance with one embodiment, the substrate 20 is rinsed twice in hydrochloric acid, each time for 20 to 60 seconds (e.g. 30 seconds). The hydrochloric acid 32 can have a concentration in the range of 8-12% (mass percent). The above described steps can improve the adhesion of the subsequently deposited platings.

The substrate 20 is then plated, without an intermediate water rinsing (i.e. "wet to wet"), in a so-called nickel strike process. In the experiments, e.g. a nickel strike bath 33 was used, which can be a solution of demineralized water (also known as fully desalinated water or FD water), nickel(II) chloride (e.g. in the form of nickel(II)chloride hexahydrate, NiCl2 6 H2O) and hydrochloric acid (36 mass percent). For 1000 ml of water there will then be, e.g. 240 g of nickel(II) chloride hexahydrate and 125 g of 36% hydrochloric acid. The galvanization in the nickel strike bath 33 can be carried out at a current density of, e.g. 2-10 amperes per $dm^2$, for about 2 minutes (first stage). After this, the current density can be reduced to about 1-2 amperes per $dm^2$ for a further two minutes (second stage). Depending on the specific composition of the nickel strike electrolytes 33, the current density and the treatment duration may also be different. The nickel strike method outlined in diagram (d) of FIG. 2 is well known and the suitable nickel strike electrolytes are commercially available and described in the relevant professional literature. After this, the nickel plated substrate 20 can be rinsed in demineralized water (for approximately 30 seconds, not shown in FIG. 2). The nickel plating 21' produced on the substrate serves as an adhesion-promoting layer for the following tin layer. Although, in the example of FIG. 2, the entire surface of the stainless steel substrate 20 is plated, it may also suffice to plate only the joining surfaces of the stainless steel substrate 20, i.e. those surfaces that will subsequently be soldered. The layer thickness of the nickel plating 21' is comparably small, e.g. smaller than 1 μm. In the embodiments described here, the thickness of the nickel plating 21' is considerably smaller than 500 nm.

Without previous drying (wet to wet), the substrate 20 is then immersed into a tin bath 34 (tin electrolyte) and is galvanically tin plated. The substrate 20 (with the nickel plating 21') can then be immersed into a tin bath for approximately 10-20 seconds, with no application of current. A strongly acidic electrolyte (with a pH value of, e.g. less than 1) is used as the tin electrolyte. Other methods have generally proved to be less suitable. For example, a sulfuric acid bright tin bath could be used, which is commercially available, for example, from Dr.-Ing. Max Schlötter GmbH & Co. KG, Geislingen, Germany under the brand name of SLOTOTIN 30-1. In some applications, the immersion duration (without the application of current) is 20-40 seconds. The galvanic plating is then carried out with currents of approximately 0.5-1.5 amperes per $dm_2$ (for example, 1-1.3 $A/dm^2$) until a layer thickness dT of approximately 10-30 μm has been reached. In some embodiments the layer thickness dT is in the range of 12-15 μm. The tin layer 21 remains sufficiently adhered after the subsequent soldering process as well. Since, as explained earlier, the thickness of the nickel plating 21' is generally smaller than 1 μm, the total thickness of the layers 21' and 21 is essentially determined by the layer thickness $d_T$ of the tin layer 21.

Figure 3:
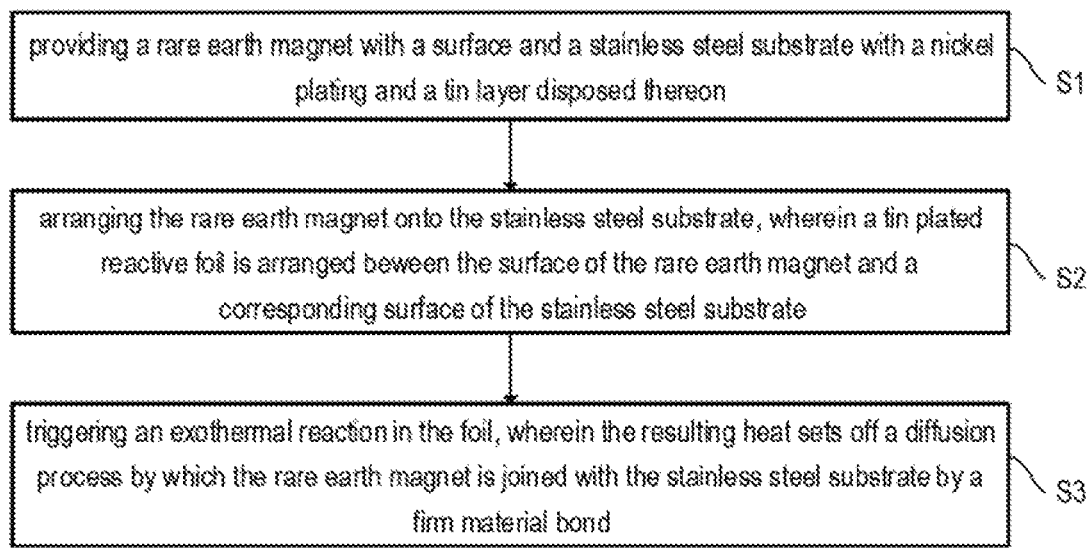
FIG. 3 is a flow chart illustrating the joining process using soldering.

FIG. 3 is a flow chart illustrating the joining process for attaching a rare earth magnet to a stainless steel substrate, previously tin plated as described above, by means of soldering. In the first step S1, a tin plated rare earth magnet (for example, a neodymium iron boron magnet with a galvanically produced tin layer having a thickness of approximately 15 μm) is provided. In a second step S2 the rare earth magnet is arranged onto the substrate, wherein the substrate is a stainless steel substrate plated in accordance with the method described above (see FIG. 2). A tin plated reactive foil is disposed between the joining surface of the rare earth magnet and a corresponding joining surface of the stainless steel substrate 20, for example, the NanoFoil® described above. The third step S3 entails the actual soldering process. In this step, an exothermal reaction is triggered in the reactive foil (e.g. by applying an electrical voltage). The heat produced as a result of this sets off a diffusion process that joins the rare earth magnet and the tin plated stainless steel substrate with a firm material bond.

With the aid of the method described above (see FIG. 2) for the pretreatment of the stainless steel substrate 20, a sufficiently secure adhesion of the tin layer on the surface of the stainless steel substrate is maintained after the soldering process as well. As previously mentioned, adhesion strengths of up to 15 $N/mm^2$ were achieved in shear tests. Naturally, not only can rare earth magnets be soldered onto a (suitably pretreated) stainless steel substrate using the soldering method described above, but virtually any other metal component as well.

The sandblasting is decisive for the strength of the subsequently produced solder bond. In shear tests, stainless steel substrate and rare earth magnet composites soldered together without sandblasting suffered an adhesion break between the stainless steel substrate 20 and the tin layer 21 under a shear load of only 1 MPa. The tin layer 21 itself, however, (without subsequent soldering) adheres with sufficient strength with or without the sandblasting, as demonstrated in adhesion and shear testing. Rinsing the stainless steel substrate 20 with hydrochloric acid is equally decisive. In one control experiment this hydrochloric acid rinse was substituted with a rinse in demineralized water, which in shear testing was also shown to result in an insufficient bonding strength of the composite. In this case as well, an adhesion break between the stainless steel substrate 20 and the tin layer 21 was observed. When stainless steel substrates that had been previously treated before soldering in accordance with the method described here were shear tested, however, no adhesion break of the soldered bond of the composites took place, instead a cohesion break in the tin layer was observed. The cohesion break occurred under a shear load of over 15 MPa.

The invention claimed is:

1. A method comprising:
    sandblasting at least one joining surface of a stainless steel substrate;
    treating the sandblasted at least one joining surface of the stainless steel substrate with an aqueous solution containing sulfuric acid, nitric acid and hydrofluoric acid;
    rinsing the treated at least one joining surface of the stainless steel substrate with hydrochloric acid;
    electrodeposition of a nickel coating on the rinsed at least one joining surface of the stainless steel substrate;
    deposition of a tin layer on the nickel-coated at least one joining surface of the stainless steel substrate;
    arranging a solder foil on the tin layer deposited on the at least one joining surface of the stainless steel substrate;
    arranging a rare earth magnet on the solder foil so that the solder foil lies between the at least one joining surface of the stainless steel substrate and the rare earth magnet; and
    establishing a solder joint by heating the solder foil.

2. The method according to claim 1, wherein the sandblasting represents compressed air blasting with corundum particles at a blasting pressure of 1-10 bar.

3. The method according to claim 1, wherein the aqueous solution comprises the following: 1-20 mass percent sulfuric acid, 1-20 mass percent nitric acid, 1-15 mass percent hydrogen fluoride and water.

4. The method according to claim 1, wherein hydrochloric acid with a concentration of 5 mass percent or more is used to rinse the treated at least one joining surface of the stainless steel substrate.

5. The method according to claim 1, wherein the stainless steel substrate after rinsing is placed in a nickel strike electrolyte without prior drying, wherein the nickel coating electrodeposited on the rinsed at least one joining surface is formed from the nickel strike electrolyte.

6. The method according to claim 5, wherein the step of electrodeposition of the nickel coating on the rinsed at least one joining surface of the stainless steel substrate includes electrodepositing the nickel strike electrolyte onto the rinsed at least one joining surface of the stainless steel substrate, a current flowing for the electrodeposition between the nickel strike electrolyte and the rinsed at least one joining surface of the stainless steel substrate has a first current in a first time interval, and then has a second, lower current for a second time interval.

7. The method according to claim 1, wherein after the electrodeposition of the nickel coating, the nickel-coated at least one joining surface of the stainless steel substrate is placed in a tin bath without prior drying in order to deposit the tin layer on the nickel-coated at least one joining surface of the stainless steel substrate.

8. The method according to claim 7, wherein the nickel-coated at least one joining surface of the stainless steel substrate is first immersed in the tin bath without current and, after an immersing time, galvanic tinning is started, whereby for galvanic deposition between the tin bath and the nickel-coated at least one joining surface of the stainless steel substrate electricity flows, and the tin bath has a pH of less than 1.

9. The method according to claim 1, wherein the nickel-coated at least one joining surface of the stainless steel substrate is rinsed with demineralized water after the deposition of the nickel coating and before the deposition of the tin layer.

10. The method according to claim 1, wherein the sandblasted at least one joining surface of the stainless steel substrate is blown off with oil-free compressed air after the sandblasting and before treatment with the aqueous solution.

11. The method according to claim 1, wherein the solder foil is a multilayer system which is designed to initiate a diffusion process by an exothermic reaction, by which the solder joint is formed between the rare earth magnet and the tin layer deposited on the at least one joining surface of the stainless steel substrate.

* * * * *